United States Patent [19]

Rosen

[11] 3,933,988

[45] Jan. 20, 1976

[54] METHOD OF SIMULTANEOUSLY PRODUCING CHLORINE DIOXIDE AND A SULFATE SALT

[75] Inventor: Herbert J. Rosen, Yonkers, N.Y.

[73] Assignee: Hooker Chemicals & Plastics Corporation, Niagara Falls, N.Y.

[22] Filed: Sept. 17, 1970

[21] Appl. No.: 72,924

Related U.S. Application Data

[63] Continuation-in-part of Ser. No. 589,113, Oct. 24, 1966, abandoned.

[52] U.S. Cl. ............... 423/480; 423/551; 423/552
[51] Int. Cl.² .......................................... C01B 11/02
[58] Field of Search ....... 23/152, 121; 423/552, 480

[56] References Cited
UNITED STATES PATENTS

| | | | |
|---|---|---|---|
| 2,373,830 | 4/1945 | Holst | 23/152 |
| 2,598,087 | 5/1952 | Wayman et al. | 23/152 |
| 2,811,420 | 10/1957 | Pernert | 23/152 |
| 2,863,722 | 12/1958 | Rapson | 23/152 |
| 3,347,628 | 10/1967 | Sepall et al. | 23/152 X |
| 3,563,702 | 2/1971 | Partridge et al. | 23/152 X |

FOREIGN PATENTS OR APPLICATIONS

| | | | |
|---|---|---|---|
| 668,191 | 12/1965 | Belgium | 23/152 |

*Primary Examiner*—Earl C. Thomas
*Attorney, Agent, or Firm*—Peter F. Casella; William J. Crossetta, Jr.

[57] ABSTRACT

A process for the production of chlorine dioxide and a sulfate salt comprising mixing an aqueous solution of a chlorate, sulfuric acid and sulfur dioxide, reacting said mixture under reduced pressure near the boiling point of said solution at a temperature of 50° to about 95° centigrade to generate chlorine dioxide, removing water from the chlorate solution as water vapor with the generated chlorine dioxide, feeding replenishing amounts of aqueous chlorate to said reaction mixture to increase the concentration of the cation of said chlorate so as to have it exceed the saturation point of the sulfate of said cation under said reaction conditions, crystallizing a sulfate salt of said cation from said reaction mixture and recovering said sulfate salt.

8 Claims, 1 Drawing Figure

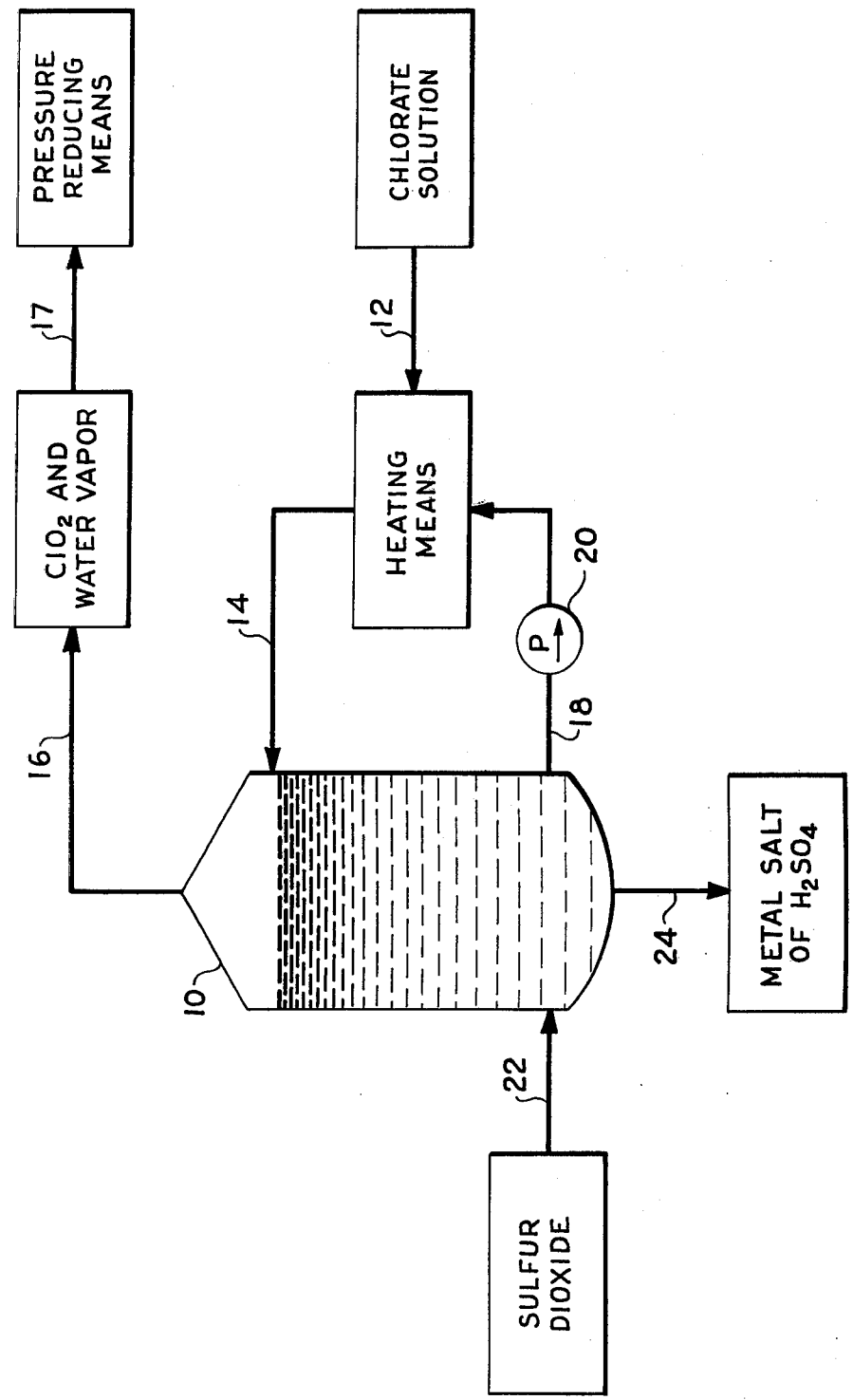

METHOD OF SIMULTANEOUSLY PRODUCING CHLORINE DIOXIDE AND A SULFATE SALT

RELATED APPLICATION

This application is a continuation-in-part of Ser. No. 589,113, filed Oct. 24, 1966, and now abandoned.

This invention relates to the production of chlorine dioxide under conditions whereby a sulfate salt is simultaneously produced under the same reaction conditions. More particularly, this invention relates to a method of producing chlorine dioxide under reduced pressures, using sulfer dioxide as a reducing agent under conditions by which a sulfate salt of the cation of the chlorate used is crystallized from the reaction solution.

Numerous processes are known for the production of chlorine dioxide by reaction of a strong acid and a chlorate in the presence of a reducing agent. Various processes have been suggested for the reaction of an alkali metal chlorate in the presence of a strong acid, such as sulfuric acid and sulfur dioxide as the reducing agent. While these processes have various desirable features, they are usually attended by certain undesirable features. In most instances, these processes utilize an excess of strong acid which requires recovery steps for economical use of the process. Also, most of these processes did not result in a convenient way or recovering the alkali metal sulfate by-product without complicated concentrating and crystallizing steps which usually involve refrigeration to extremely low temperatures.

It is an object of the present invention to provide a method for producing chlorine dioxide while simultaneously recovering a sulfate salt of the chlorate cation under the same reaction conditions. It is another object of the present invention to provide a simplified method for producing chlorine dioxide utilizing sulfur dioxide as the reducing agent, with or without an additional reducing agent. These and other objects will become apparent to those skilled in the art from the description of the invention which follows.

In accordance with this invention, there is provided an improvement on a continuous process for the production of chlorine dioxide and a sulfate salt wherein a reducing agent is continuously introduced into an aqueous reaction solution maintained from about 1–12 normal in sulfuric acid and from 0.005 to about 3.5 molar in a chlorate at a temperature between 50° to about 95° centigrade to produce chlorine dioxide and solid sulfate salt, which comprises conducting said continuous process by introducing sulfur dioxide as the reducing agent into a unilocular vessel containing said reaction solution under reduced pressure of from 50 to about 700 millimeters mercury absolute, wherein said pressure is coordinated with the temperature of the reaction solution to effect the evaporation of water from said aqueous reaction solution at a rate sufficient to maintain a substantially constant volume of reaction solution, whereby chlorine dioxide is continuously generated and removed from said vessel in admixture with said evaporated water and said sulfate salt is crystallized from said aqueous reaction solution in said unilocular vessel and recovered.

The process of this invention provides for the production of chlorine dioxide, a smaller amount of sulfate salt than is produced when sulfuric acid is employed in conjunction with a metal chloride reducing agent and results in no acid effluent from the unilocular generator-evaporator-crystallizer vessel. Thus, only desired products, utilizeable in bleaching operations are produced without the acid effluent disposal problem and consequent pollution of surface water which attends the operation of conventional chlorine dioxide generating systems of the commercial art.

By the expression — unilocular vessel — applicant means a vessel containing one chamber free from internal zoneing structure within its envelope. The process steps involving the generation of $ClO_2$, the formation of a solid sulfate salt and the evaporation of water from the reaction solution, all occur within the same solution, at the same site within the unilocular vessel, the necessary reactants being continuously introduced into the reaction solution and the gaseous products of reaction being continuously withdrawn in admixture with water vapor while the solid sulfate salts simultaneously and continuously separate from the reaction solution.

The present process has numerous advantages over prior art processes of producing chlorine dioxide using sulfur dioxide as the reducing agent. In particular, the present process produces only the desired product of chlorine dioxide and a sulfate salt, both of which are produced utilizing a minimum of equipment and operating expense. In addition, the present process can be operated in a manner whereby a second reducing agent is utilized to increase the yield of chlorine dioxide produced from the chlorate and further to increase the amount of sulfate salt produced as may be desired in certain pulping and bleaching operation.

The invention will be described more fully by reference to the drawing which is a pertial schematic and flow sheet illustrating the invention.

The process is operated by establishing the desired reaction solution in reactor 10 by feeding an aqueous solution of chlorate via line 12 through the heating temperature control means and subsequently to reactor 10 via line 14. the temperature within the reactor is maintained between about 50° and 95° centigrade by establishing a reduced pressure within reactor 10 at or near the boiling point of the reaction solution, e.g., within about 10° centigrade. On commencing the reaction, chlorine dioxide and water vapor are withdrawn via line 16 by means of the pressure reducing means to a chlorine dioxide recovery system prior to exhausting the residual gases via line 17 through the pressure reducing means. Heat and additional chlorate solution are supplied to the reactor via a circulating stream of reaction liquors withdrawn from reactor 10 via line 18 and line 20. Alternatively, replenishing amounts of chlorate solution can be added separately to the reactor. Also, other heating means can be used such as heaters within or surrounding the reactor to supply the heat requirements.

The acidity is maintained within the reactor by the addition of sulfur dioxide via line 22. On continued operation, the sulfate salt of the chlorate cation reaches the saturation point within the reactor and commences to precipitate as a sulfate salt. The crystallized salt is removed either periodically or continuously from reactor 10 via line 24 normally as a slurry with a small portion of the mother liquor. The salt is separated from the mother liquor, the mother liquor returned to the reactor. Of particular economical advantage in the present invention is the ability to utilize the same vessel as a combination generator-crystallizer-evaporator without any internal structural provision for zoneing, thus eliminating the need for special construction or auxiliary concentrating, crystallizing and refrigeration equipment.

The present invention may utilize any chlorate salt as the source of the generated chlorine dioxide. However, metal chlorates, particularly alkali metal chlorates such as sodium, potassium, lithium, rubidium, cesium, and alkaline earth metals, such as calcium and magnesium are most commonly used. Of these, sodium chlorate is preferred because of its ready availability commercially and its normally less cost. Therefore, the invention is more fully described herein with reference to sodium chlorate as the chlorate salt. However, it is recognized that in place of sodium chlorate, other inorganic chlorates can be utilized to obtain correspondingly good results.

The present invention utilizes sulfuric acid as the acid catalyst for the reaction of the chlorate with the reducing agent to produce chlorine dioxide. The reaction is effected at an acid normality of about 1 to 12 normal and more preferably at about 3 to 12 normal. The acid catalyzes the reaction and, therefore, the reaction rate is higher at the higher acid normalities. However, in utilizing the higher acid normalities above about 4.5, an acid sulfate salt, such as sodium bisulfate is the predominant sulfate salt produced. At lower acid normalities, particularly below about 4.4 normal, the acid free sulfate salt is the primary salt produced. It is often preferred to produce the acid free salt because this reduces the loss of acid values from the reaction solution. When operating in the lower acidity range, it is therefore preferred to utilize a catalyst for the reaction to increase the rate and yield of chlorine dioxide based on the chlorate consumed. The preferred catalysts are vanadium pentoxide, silver ions, manganese ions, dichromate ions and arsenic ions, as well as mixtures thereof. Therefore, to obtain a predominance of the acid free sulfate salt, it is preferred to operate the reaction at a generator acidity of about 3 to 4.4. To obtain a predominantly bisulfate salt, it is preferred to operate the generator at the higher acidity, that is above about 4.5 to about 12.

The reducing agent utilized in the present invention is sulfur dioxide. The sulfur dioxide can be supplied in dilute form such as that obtained from sulfur burners or as a substantially pure material such as liquefied sulfur dioxide or anhydrous sulfur dioxide. Substantially pure sulfur dioxide or sulfur dioxide diluted with a minor proportion of inert gases is preferred in the present invention to thereby reduce the load on the pressure reducing means. If the quantity of air or other inert gases fed to the reactor with the sulfur dioxide is large, the pressure reducing requirement will be increased to in order to maintain the desired reduced pressure.

The sulfur dioxide fed to the generator replenishes the sulfate ion removed from the generator as sulfate salt and maintains the acidity of the reactor by reaction of sulfur dioxide with water to form sulfuric acid. Thus, the generator acidity is maintained without the addition of further amounts of sulfuric acid and, in fact, an outside source of such acid is not required. However, in the initial start up, it is often most convenient to acidify the reaction solution with sulfuric acid to commence the reaction without waiting for a buildup of the acidity to the desired level by the addition of sulfur dioxide.

The sulfur dioxide is preferably added to the reaction solution utilizing gaseous dispersion means and/or rapid agitation to give the gas sufficient time to dissolve in the reaction solution. Thus, the gas normally enters near the bottom of the reactor or is dissolved in a separate stream prior to entering the reactor. Agitation means such as stirrer, liquid or gaseous jets and the like can be used.

In addition to sulfur dioxide, an additional reducing agent may be used to enhance the reaction efficiency of the reaction. When a chloride salt of the same cation as the chlorate is used, the amount of sulfate salt can also be increased as desired to satisfy the needs of the particular pulping and bleaching operation, while at the same time enhancing the efficiency of the reaction. Therefore, a supplementary reducing agent, such as methanol and formaldehyde may be used, or more preferably, a chloride reducing agent, such as hydrogen chloride or a chloride salt.

The chloride used can be any chloride salt, particularly a metal chloride, such as the alkali metal or alkaline earth metal chlorides, preferably, a chloride salt having a cation corresponding to the chlorate cation. Although a metal chloride is usually preferred, hydrogen chloride in the form of hydrochloric acid, anhydrous HCl, gaseous hydrogen chloride and the like and mixtures thereof can be used with correspondingly good results.

When a supplementary reducing agent is used, it is preferable to use about 1 to about 30 mole per cent or more based on the mole weight of chlorate. Particularly good results are obtained using about 2 to 15 per cent based on the weight of the chlorate. When a metal chloride is utilized as the supplementary reducing agent, a corresponding increase in the metal sulfate salt results. Thus, the reaction can be controlled to provide a greater or lesser amount of sulfate salt as may be desired in the particular pulping and bleaching operation by greater or less additions of the metal chloride.

The unilocular vessel, which can be considered to be a generator, evaporator and crystallizer, is operated under a reduced pressure which provides a temperature of about 50° to 95° centigrade. Depending upon the vapor pressure for the particular reaction solution used, the pressure will be in the range of about 50 to 700 millimeters of mercury pressure absolute. More preferably, the pressure is set to obtain a reaction temperature in the more preferred range of about 65° to 85° centigrade. Thus, the pressure is most preferably in the range of about 100 to 400 millimeters of mercury absolute.

The concentration of chlorate ion in the aqueous reaction solution can be maintained between about 0.005 molar to just below the solubility limit thereof which is about 3.5 molar at the higher operating temperatures. More preferably, the chlorate concentration is maintained at about 2 to 3 molar and most preferably at about 2.5 molar. The chlorate concentration is maintained at the desired level by adjusting the feed rate.

The acidity within the reactor is determined by the concentration of acid in the initial charge of generator solution.

The desired sulfate salt may be recovered by control of the average acidity of the reaction solution during continuous operation. The average acidity is that acidity established as the mean value of any fluctuation in the concentration of acid during any given reaction period. Although the acidity of the reaction solution may be quite accurately controlled, small additions of sulfuric acid may be made continuously or periodically to make up acid values not completely satisfied by the rate of conversion of sulfur dioxide to sulfuric acid in situ. When a supplementary reducing agent is utilized, it can be conveniently fed to the reactor in solution with the chlorate. Under such conditions, the concentration of the supplementary reducing agent, as when it is a chloride, is maintained below the saturation point and preferably below that of the chlorate.

The scope of the present invention has been described with respect to a number of parameters. However, this is not to be construed to mean that every possible combination of values from within the aforementioned operating ranges may be selected, as those skilled in the art will appreciate, to obtain desirable operating conditions. However, for every value in a given range, there is a range of corresponding values which fall in a broad range within which the process is desirably operated. For instance, low acidities, such as below about 1 normal are not used because, under these conditions, operations at the highest permissible temperatures, result in too low a production rate of chlorine dioxide from a practical point of view. However, at the low acidities, improved results are best obtained utilizing a catalyst for the reaction, thereby increasing the gram atom per cent yield and rate of reaction.

The following examples illustrate certain preferred embodiments of the present invention. Unless otherwise indicated, all parts and percentages used herein are by weight and all temperatures are in degrees centigrade.

EXAMPLE 1

The process of the present invention was operated as illustrated in the drawing, utilizing a unilocular generator-evaporator-crystallizer apparatus having a liquid outlet in the lower portion thereof for the withdrawal and circulation of reaction solution and a gaseous withdrawal means for the withdrawal of generated chlorine dioxide and water vapor in communication with the upper portion of the reactor. The gaseous withdrawal means passed the gases from the reactor through a condenser system and water absorber thereby removing the chlorine dioxide and water prior to exhausting the gases through a vacuum pump. A conduit for the withdrawal of sulfate salts produced in the reactor was located in the bottom portion of the reactor. A sulfur dioxide feed means was also located near the bottom of the reactor. A liquid recirculation means utilized a thermosiphon heat pump to withdraw reaction solution from the reactor, heated it to an elevated temperature and returned the heat solution with replenishing amounts of chlorate solution to the reactor. The recirculation rate was sufficient to provide a rapid and thorough agitation of the reaction solution within the reactor.

The reaction was commenced by establishing a sulfuric acid concentration of about 10 normal in the reactor and a sodium chlorate concentration of about 2.5 molar. The solution was placed under a reduced pressure of 200 millimeters of mercury absolute. Heat was supplied to the reactor to maintain the solution at its boiling point, about 75° centigrade under the reduced pressure. The acidity of the solution was maintained at about 10 normal by feeding anhydrous sulfur dioxide at a rate of 16 parts per minute to the reaction solution. The sodium chlorate concentration was maintained at the desired level by feeding replenishing amounts of 4.22 molar sodium chlorate solution at a rate of 54 parts per minute. Agitation within the reactor by means of recirculation was maintained at a sufficient rate to thoroughly disperse the sulfur dioxide thus causing it to be substantially absorbed within the solution. A small amount of diluent air was allowed to enter the reactor along with the sulfur dioxide to further dilute the produced chlorine dioxide. After reaching steady state conditions, chlorine dioxide was produced at the rate of 3.6 parts per minute and removed from the reactor along with substantial quantities of water vapor. The water removed from the reactor as water vapor was in an amount sufficient to maintain a substantially constant level within the reactor. On continuing the reaction at the given feed rates, the saturation point of the sulfate salt of the sodium ion was reached within the reactor and crystallization of a salt was observed within the reactor. The salt was periodically removed from the reactor, along with a portion of mother liquor. The salt was then separated from the mother liquor by filtration and the mother liquor returned to the reactor. Analysis of the recovered salt indicated that it was substantially anhydrous sodium bisulfate. Analysis of the gas stream being withdrawn from the reactor determined that chlorine dioxide was being generated at a 95 per cent yield based on the sodium chlorate fed to the reactor.

EXAMPLE 2

This example illustrates a method of utilizing a supplementary reducing agent to increase the yield of chlorine dioxide based of the chlorate fed to the reactor.

The method and apparatus of Example 1 is repeated utilizing the same reaction conditions and feed rates wherein the sodium chlorate solution is supplemented with seven mole per cent of sodium chloride based on the sodium chlorate. Again, after establishing steady state conditions, a salt is observed crystallizing in the generator. Analysis of the chlorine dioxide gas withdrawn from the generator indicates that the yield of chlorine dioxide based on the sodium chlorate used is increased by about three to four per cent utilizing the additional sodium chloride reducing agent. Also, an increase in sulfate salts commensurable with the additional sodium ion fed to the reactor with the sodium chlorate is recovered from the reactor as anhydrous sodium bisulfate.

EXAMPLE 3

This example illustrates a method of operating the present invention at a lower acidity to produce an increase in sodium acid free sulfate salt. The method and apparatus of the Example 1 was utilized wherein the acid normality of the reaction solution was about 5.2 normal and the sodium chlorate concentration was about 2.8 molar. The solution was subjected to a reduced pressure of about 200 millimeters of mercury absolute. Sufficient heat was supplied to the reaction solution to maintain the solution at the boiling point which was about 75° centigrade. Agitation of the solution within the reactor was effected by use of a thermosiphon heat pump. The reaction was sustained by feeding replenishing amounts of anhydrous sulfur dioxide at a rate of 600 standard parts per minute to the reaction solution and sodium chlorate at a rate of about 500 parts per hour of aqueous 4.22 molar sodium chlorate solution.

On achieving steady state reaction conditions, a salt was observed crystallizing in the reaction solution. The salt was collected and periodically removed from the reactor along with a portion of mother liquor. The salt was separated from the mother liquor and the mother liquor was returned to the reactor for further reaction. Analysis of the recovered salt indicated that it was comprised of about 64 per cent anhydrous sodium sulfate and about 36 percent anhydrous sodium bisulfate. The gases liberated from the generator were analyzed and found to be substantially chlorine dioxide with a small amount of chlorine.

The proportion of sodium sulfate salt to sodium bisulfate salt is further increased by reducing the acidity of the reaction solution further to below about 4.4 normal. Under such lower acidity operating conditions, it is desirable to utilize a catalyst for the reaction to increase the rate of reaction and the gram atom per cent yield of chlorine dioxide, and/or to utilize a supplementary reducing agent as in Example 2.

The process of Example 3 is greatly improved utilizing a catalyst for the reaction. With a catalyst, the yield of chlorine dioxide based on the sodium chlorate utilized is increased up to about a 95 per cent yield or higher.

In the same manner, other chlorates such as potassium chlorate, lithium chlorate, cesium chlorate, calcium chlorate, magnesium chlorate, and the like are used in the process of Examples 1, 2 and 3 with correspondingly good results, thereby producing and recovering a sulfate salt corresponding to the cation of the chlorate used.

What is claimed is:

1. In a continuous process for the production of chlorine dioxide and a sulfate salt wherein a reducing agent is continuously introduced into an aqueous reaction solution maintained from about 1–12 normal in sulfuric acid and from 0.005 to about 3.5 molar in chlorate at a temperature between 50° to 95° centigrade to produce chlorine dioxide and solid sulfate salt, the improvement which comprises conducting said continuous process by introducing $SO_2$ as the reducing agent into a unilocular zone containing said reaction solution under reduced pressure of from 50 to about 700 millimeters mercury absolute, wherein said pressure is coordinated with the temperature of the reaction solution to effect the evaporation of water from said aqueous reaction solution at a rate sufficient to maintain a substantially constant volume of reaction solution, whereby chlorine dioxide is continuously generated and removed from said zone in admixture with said evaporated water and said sulfate salt is crystallized from said aqueous reaction solution in said unilocular zone and recovered.

2. The process of claim 1 in which said sulfate salt is $Na_2SO_4$.

3. The process of claim 1 in which said sulfate salt is $NaHSO_4$.

4. The process of claim 1 in which said temperature is between about 65° to about 85° centigrade and said pressure is between about 100 to about 400 millimeters mercury absolute.

5. The process of claim 1 in which the average acidity of said reaction solution is between about 3 to about 4.4 normal sulfuric acid to produce $Na_2SO_4$.

6. The process of claim 1 in which the average acidity of said reaction solution is between about 4.5 to about 12 normal sulfuric acid to produce $NaHSO_4$.

7. The process of claim 1 in which the concentration of chlorate in said reaction solution is from about 2 to about 3 molar.

8. The process of claim 1 in which a reducing agent selected from the group consisting of a chloride salt, HCl, methanol and formaldehyde is employed to supplement the action of $SO_2$, in an amount from 2 to 15 mole weight percent based upon the amount of chlorate present in said reaction solution.

* * * * *